US008817007B2

(12) United States Patent
Lee et al.

(10) Patent No.: US 8,817,007 B2
(45) Date of Patent: Aug. 26, 2014

(54) REGULATOR AND ORGANIC LIGHT EMITTING DIODE DISPLAY USING THE SAME

(75) Inventors: Hyunjae Lee, Paju-si (KR); Changhoon Jeon, Kyungbuk (KR); Jinhyoung Kim, Goyang-si (KR); Jaesung Son, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 1013 days.

(21) Appl. No.: 12/884,603

(22) Filed: Sep. 17, 2010

(65) Prior Publication Data

US 2011/0069059 A1 Mar. 24, 2011

(30) Foreign Application Priority Data

Sep. 18, 2009 (KR) ........................ 10-2009-0088538

(51) Int. Cl.

| | |
|---|---|
| ***G06F 3/038*** | (2013.01) |
| ***G05F 1/00*** | (2006.01) |
| ***G09G 3/32*** | (2006.01) |
| ***G09G 3/20*** | (2006.01) |
| ***G05F 1/56*** | (2006.01) |

(52) U.S. Cl.

CPC ................ *G05F 1/56* (2013.01); *G09G 3/3233* (2013.01); *G09G 3/3291* (2013.01); *G09G 2300/0819* (2013.01); *G09G 2330/028* (2013.01); *G09G 3/20* (2013.01); *G09G 2330/02* (2013.01); *G09G 2310/061* (2013.01)

USPC .......................................... 345/212; 323/282

(58) Field of Classification Search

USPC ............ 345/212, 73–84, 204, 211, 213–215, 345/690–699; 323/282, 284; 327/541

See application file for complete search history.

(56) References Cited

U.S. PATENT DOCUMENTS

| | | | | |
|---|---|---|---|---|
| 2007/0030054 | A1 | 2/2007 | Lee et al. | |
| 2007/0171177 | A1 * | 7/2007 | Kim et al. | 345/100 |
| 2008/0174574 | A1 * | 7/2008 | Yoo | 345/204 |

FOREIGN PATENT DOCUMENTS

| | | | |
|---|---|---|---|
| CN | 101004885 | A | 7/2007 |
| CN | 101079233 | A | 11/2007 |
| JP | 2004-152092 | | 5/2004 |
| KR | 10-2007-0015827 | | 2/2007 |

* cited by examiner

*Primary Examiner* — Kent Chang
*Assistant Examiner* — Scott Au
(74) *Attorney, Agent, or Firm* — McKenna Long & Aldridge LLP

(57) ABSTRACT

A regulator and an organic light emitting diode display including the regulator are disclosed. The regulator includes a reference voltage generating unit generating a reference voltage from an input voltage, a voltage division resistor circuit dividing a voltage of an output terminal of the regulator to generate a feedback voltage, a comparator comparing the reference voltage with the feedback voltage, a transistor that is turned on or off based on an output of the comparator and switches on or off the input voltage supplied to the output terminal, and a sink current breaking circuit for discharging a sink current flowing in the output terminal to a ground level voltage source.

2 Claims, 13 Drawing Sheets

11

REGULATOR AND ORGANIC LIGHT EMITTING DIODE DISPLAY USING THE SAME

This application claims the benefit of Korea Patent Application No. 10-2009-0088538 filed on Sep. 18, 2009, the entire contents of which is incorporated herein by reference for all purposes as if fully set forth herein.

BACKGROUND OF THE INVENTION

1. Field of the Invention

Exemplary embodiments of the invention relate to a regulator with a stabilized output and an organic light emitting diode display using the same.

2. Discussion of the Related Art

Various flat panel displays (FPDs) capable of reducing the weight and the size of a cathode ray tube has been developed. Examples of the flat panel displays include a liquid crystal display (LCD), a field emission display (FED), a plasma display panel (PDP), and an electroluminescence device.

The electroluminescence device is classified into an inorganic electroluminescence device and an organic light emitting diode (OLED) display depending on a material of a light emitting layer. The electroluminescence device is a self light emitting display device and has advantages such as a fast response time, a high light emitting efficiency, a high luminance, and a wide viewing angle.

The OLED display may be driven through a driving method such as a voltage driving method, a voltage compensation driving method, a current driving method, a digital driving method, and an external compensation driving method. Recently, the voltage compensation driving method has been selected most frequently. The voltage compensation driving method is a method for compensating for a threshold voltage of a driving element supplying a current to an OLED element using a predetermined reference voltage.

The reference voltage is generated by a regulator capable of relatively stably outputting a DC voltage. The regulator is excellent in a source current performance supplying a current to each of light emitting cells of the OLED display, but is weak in a sink current reversely flowing from each of the light emitting cells of the OLED display. For example, when the sink current generally flows in the regulator, an input voltage and an output voltage of the regulator increase. When the reference voltage output from the regulator varies, the compensation for the threshold voltage of the driving element in each light emitting cell of the OLED display is nonuniformly performed. Accordingly, the display quality of the OLED display is degraded.

SUMMARY OF THE INVENTION

Exemplary embodiment of the invention provide a regulator capable of providing a stabilized output even if a sink current reversely flows and an organic light emitting diode (OLED) display capable of improving a display quality by compensating for a threshold voltage using a stable reference voltage generated by the regulator.

In one aspect, there is a regulator comprising a reference voltage generating unit configured to generate a reference voltage from an input voltage, a voltage division resistor circuit configured to divide a voltage of an output terminal of the regulator to generate a feedback voltage, a comparator configured to compare the reference voltage with the feedback voltage, a transistor configured to be turned on or off based on an output of the comparator and switch on or off the input voltage supplied to the output terminal, and a sink current breaking circuit configured to discharge a sink current flowing in the output terminal to a ground level voltage source.

The sink current breaking circuit includes a buffer connected between the voltage division resistor circuit and the output terminal. The buffer includes a p-type metal oxide semiconductor field effect transistor (MOSFET) that is connected between the output terminal and the ground level voltage source and discharges the sink current to the ground level voltage source.

The sink current breaking circuit includes a first transistor connected between the output terminal and the ground level voltage source, and a sink controller configured to turn on the first transistor when a voltage between an output node of the voltage division resistor circuit and the comparator rises.

In another aspect, there is an organic light emitting diode display comprising a display panel on which data lines and scan lines are positioned to cross one another and light emitting cells each including an organic light emitting diode and a driving thin film transistor are arranged in a matrix form, a data driver configured to supply a data voltage to the data lines, a scan driver configured to supply a scan pulse to the scan lines, and a regulator including a reference voltage generating unit configured to generate a reference voltage from an input voltage, a voltage division resistor circuit configured to divide a voltage of an output terminal of the regulator to generate a feedback voltage, a comparator configured to compare the reference voltage with the feedback voltage, a transistor configured to be turned on or off based on an output of the comparator and switch on or off the input voltage supplied to the output terminal, and a sink current breaking circuit configured to discharge a sink current flowing in the output terminal to a ground level voltage source, wherein the regulator supplies a reference voltage for compensating for a threshold voltage of the driving thin film transistor to the display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
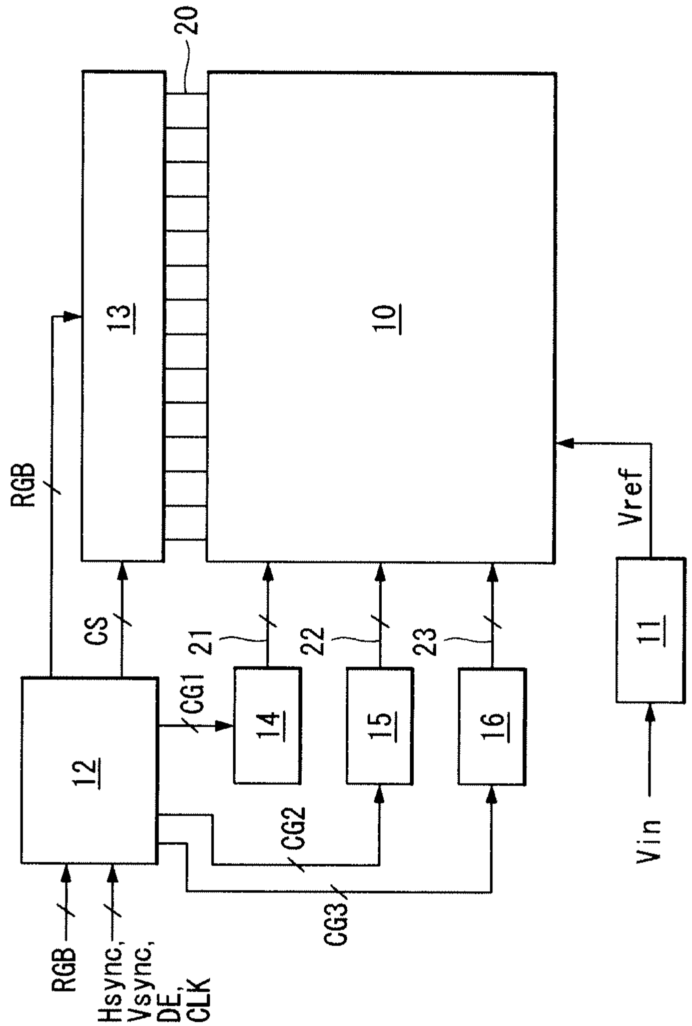
FIG. 1 is a block diagram of an organic light emitting diode (OLED) display according to an exemplary embodiment of the invention.
Figure 2:
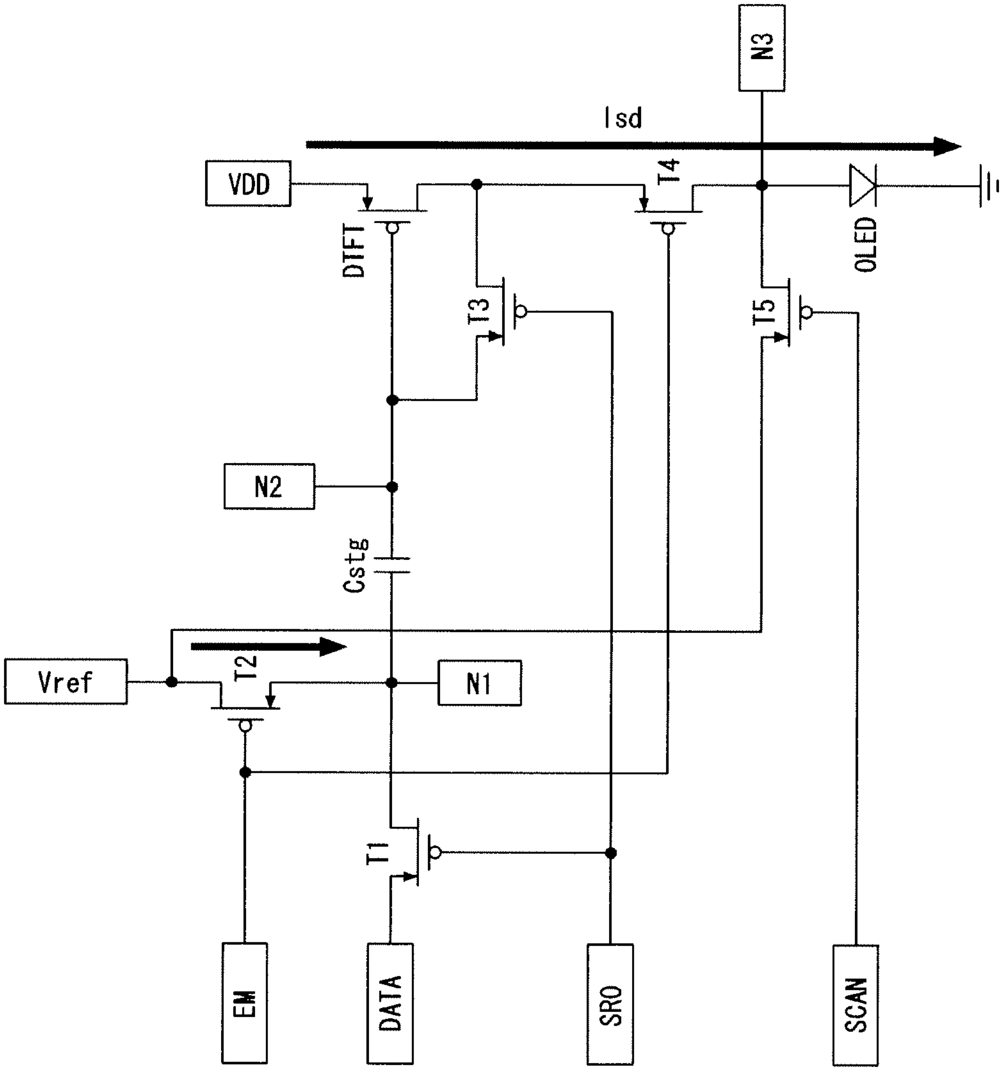
FIG. 2 is a circuit diagram illustrating a current flow during a period t1 in a light emitting cell according to an exemplary embodiment of the invention.
Figure 3:
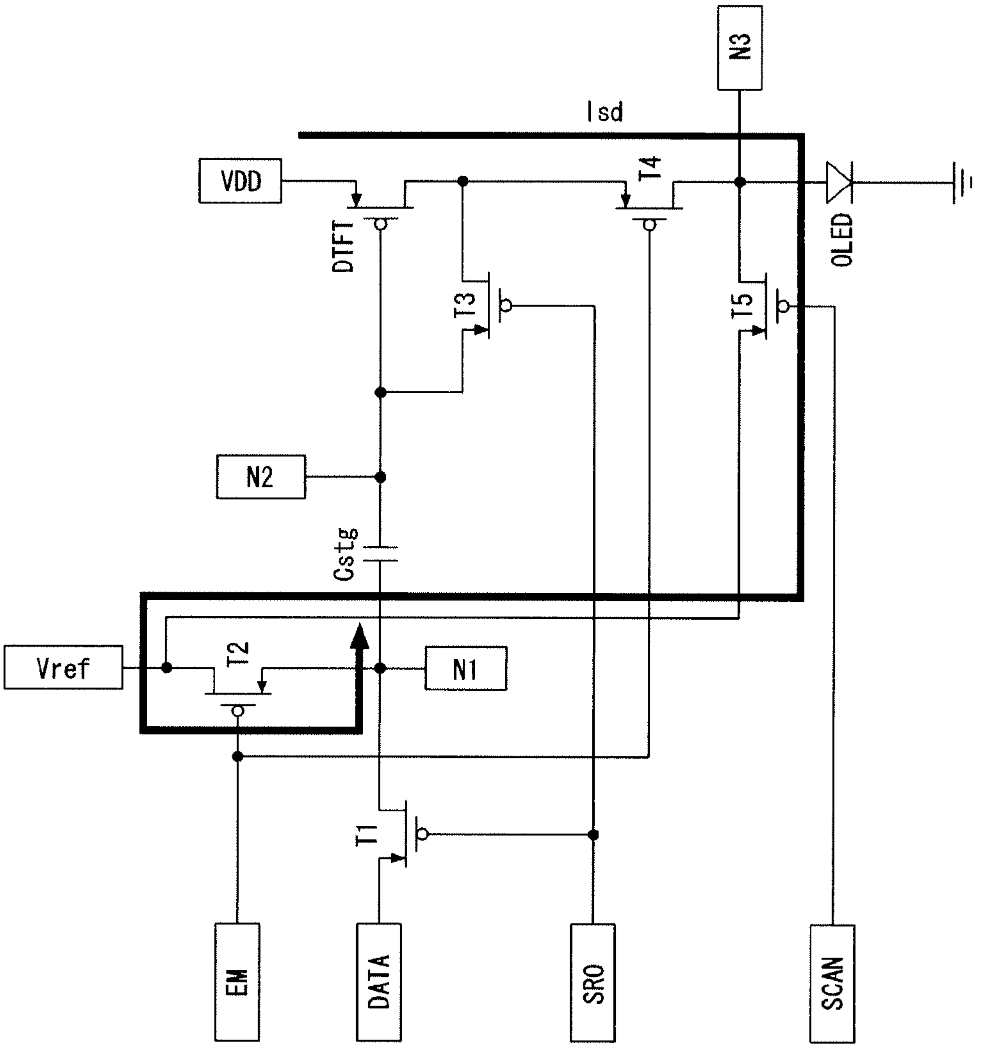
FIG. 3 is a circuit diagram illustrating a current flow during a period t2 and t3 in a light emitting cell according to an exemplary embodiment of the invention.
Figure 4:
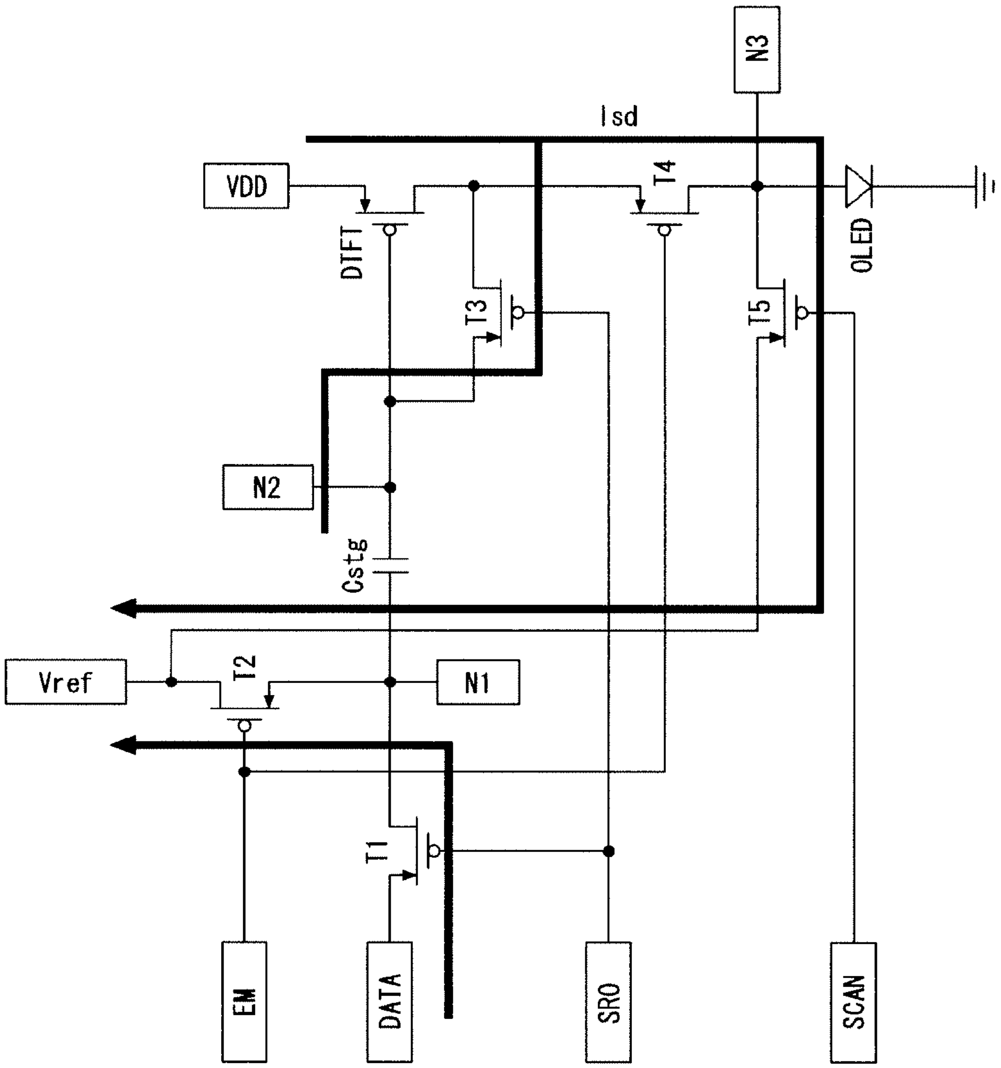
FIG. 4 is a circuit diagram illustrating a current flow during a period t4 in a light emitting cell according to an exemplary embodiment of the invention.
Figure 5:
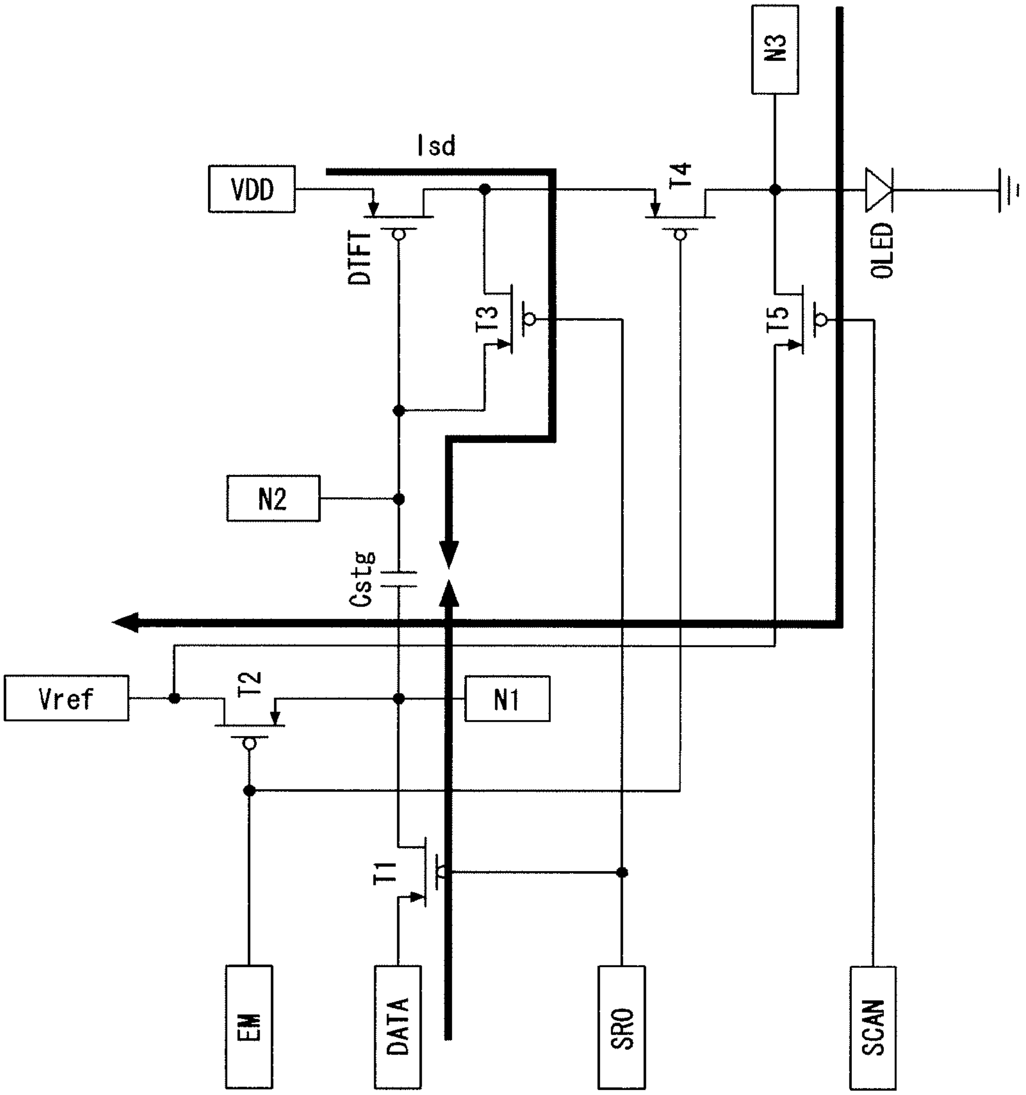
FIG. 5 is a circuit diagram illustrating a current flow during a period t5 and t6 in a light emitting cell according to an exemplary embodiment of the invention.
Figure 6:
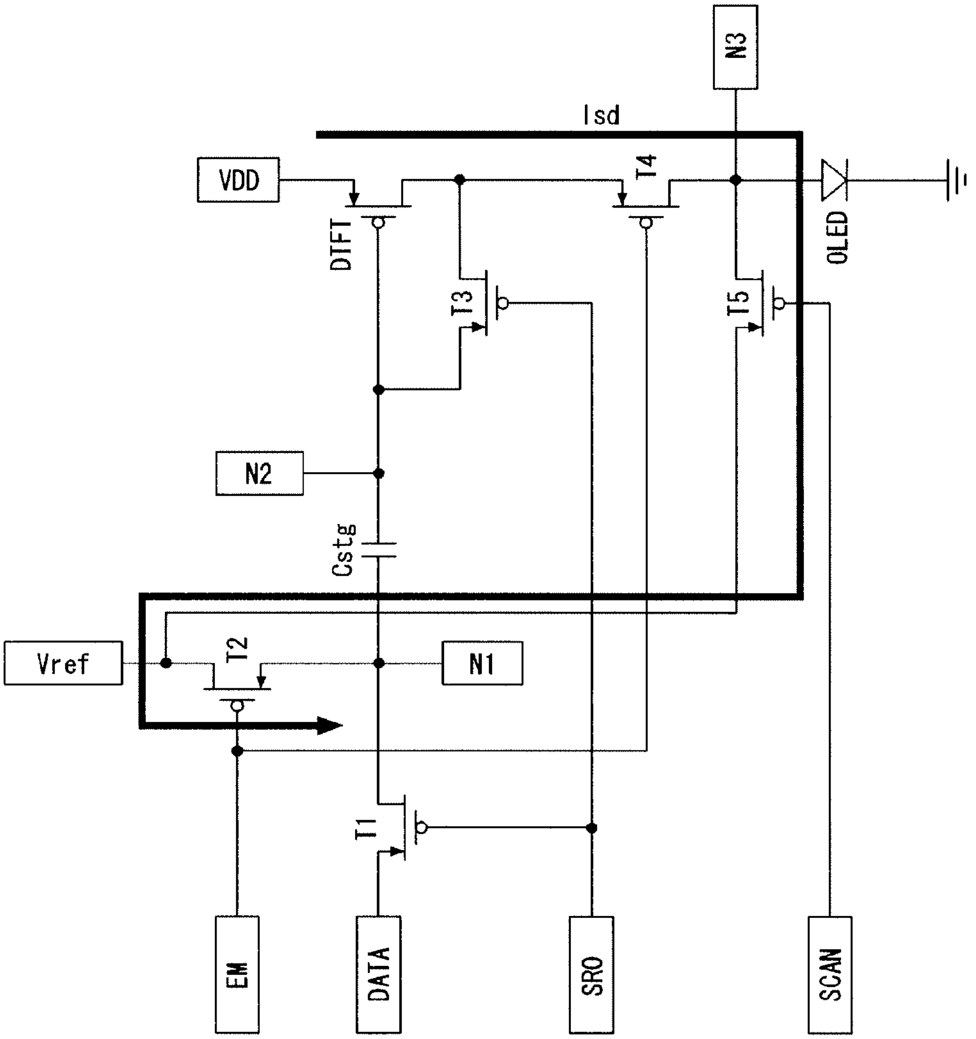
FIG. 6 is a circuit diagram illustrating a current flow during a period t7 and t8 in a light emitting cell according to an exemplary embodiment of the invention.
Figure 7:
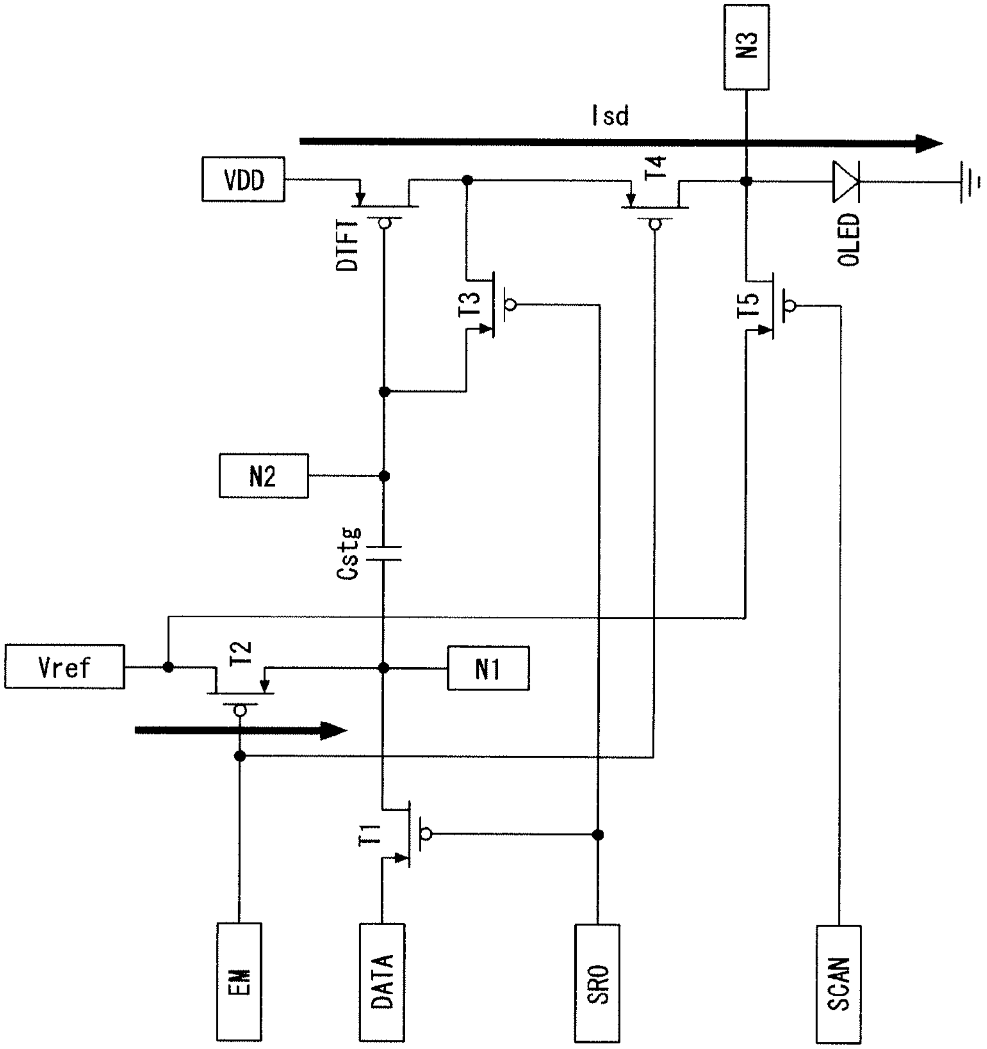
FIG. 7 is a circuit diagram illustrating a current flow during a period t9 in a light emitting cell according to an exemplary embodiment of the invention.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Reference will now be made in detail embodiments of the invention examples of which are illustrated in the accompanying drawings.

As shown in FIGS. 1 to 4, an organic light emitting diode (OLED) display according to an exemplary embodiment of the invention includes a display panel 10 on which data lines 20 and first to third scan lines 21 to 23 are positioned to cross one another and light emitting cells are arranged in a matrix form, a data driver 13 for supplying a data voltage to the data lines 20, a first scan driver 14 for sequentially supplying a first scan pulse to the first scan lines 21, a second scan driver 15 for sequentially supplying a second scan pulse to the second scan lines 22, a third scan driver 16 for sequentially supplying a light emitting control pulse to the third scan lines 23, a timing controller 12 for controlling the drivers 13 to 16, and a regulator 11 generating a predetermined reference voltage Vref.

The light emitting cells are formed in pixel regions defined by a crossing structure of the data lines 20 and the scan lines 21 to 23. A high potential power voltage VDD, a low potential power voltage or a ground level voltage GND, the reference voltage Vref, etc. are commonly supplied to the light emitting cells of the display panel 10. The reference voltage Vref is set to be less than a threshold voltage of an organic light emitting diode (OLED) element OLED. For example, the reference voltage Vref may be set to a voltage between 0.2V and 2V. The reference voltage Vref may be set to a negative voltage so that a reverse bias can be applied to the OLED element OLED in an initial state of a driving thin film transistor (TFT) for driving the OLED element OLED. In this case, because the reverse bias is periodically applied to the OLED element OLED, a degradation of the OLED element OLED is reduced. Hence, a life span of the OLED element OLED can increase.

The data driver 13 converts digital video data RGB into an analog data voltage and supplies the analog data voltage to the data lines 20.

Figure 8:
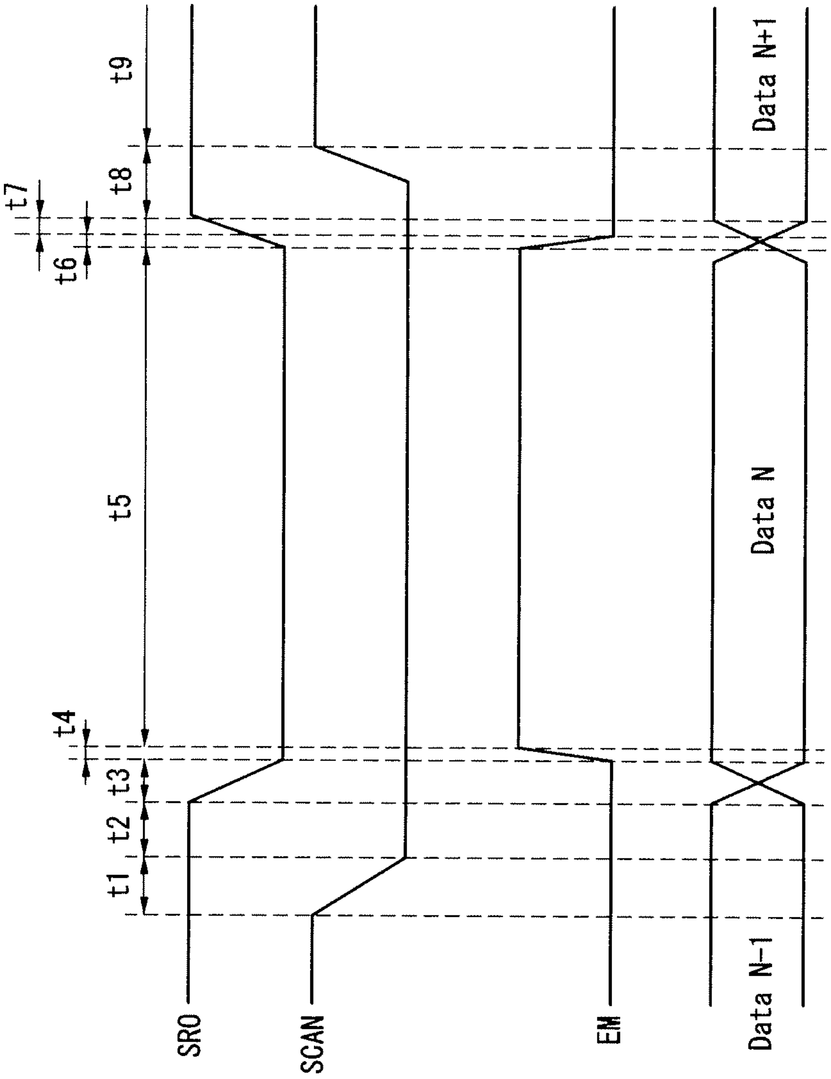
FIG. 8 is a waveform diagram illustrating a driving signal waveform of a light emitting cell according to an exemplary embodiment of the invention.
Figure 10:
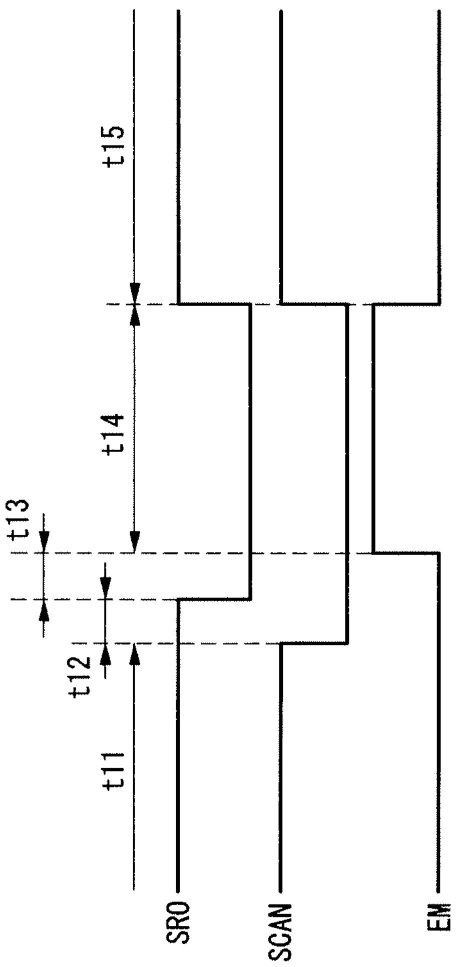
FIG. 10 is a waveform diagram illustrating a driving signal waveform of the light emitting cell shown in FIG. 9.

The first scan driver 14 sequentially supplies a first scan pulse SCAN shown in FIGS. 8 and 10 to the first scan lines 21. The second scan driver 15 sequentially supplies a second scan pulse SRO shown in FIGS. 8 and 10 to the second scan lines 22. The third scan driver 16 sequentially supplies a light emitting control pulse EM shown in FIGS. 8 and 10 to the third scan lines 23.

The timing controller 12 supplies the digital video data RGB to the data driver 13. The timing controller 12 generates timing control signals CS and CG1 to CG3 for controlling operation timing of each of the data driver 13 and the first to third scan drivers 14 to 16 using timing signals received from the outside such as a vertical sync signal Vsync, a horizontal sync signal Hsync, a data enable DE, and a clock CLK.

The regulator 11 generates the predetermined reference voltage Vref, supplies the predetermined reference voltage Vref to all of discharge cells, and discharges a sink current reversely flowing from the discharge cells to a ground level voltage source GND. The regulator 11 is described in detail with reference to FIGS. 11 to 13.

FIGS. 2 to 7 are circuit diagrams illustrating in detail the light emitting cell according to the exemplary embodiment of the invention. FIG. 8 is a waveform diagram illustrating a driving signal waveform of the light emitting cell shown in FIGS. 2 to 7.

As shown in FIGS. 2 to 8, the light emitting cell includes first to fifth TFTs T1 to T5, a driving TFT DTFT, a storage capacitor Cstg, and an OLED element OLED. The first to fifth TFTs T1 to T5 and the driving TFT DTFT are implemented as a p-type metal oxide semiconductor field effect transistor (MOSFET).

The first TFT T1 is a switch TFT for supplying the data voltage DATA to a first node N1 in response to the second scan pulse SRO. The first TFT T1 is turned on during third to sixth periods t3 to t6, in which the second scan pulse SRO is supplied, and forms a current path between the data line 20 and the first node N1. A drain electrode of the first TFT T1 is connected to the first node N1, a source electrode of the first TFT T1 is connected to the data line 20, and a gate electrode of the first TFT T1 is connected to the second scan line 22.

The second TFT T2 blocks a current path between the first node N1 and the regulator 11 in response to the light emitting control pulse EM during the fourth and fifth periods t4 and t5. The second TFT T2 is turned on during first to fourth periods t1 to t4 and seventh to ninth periods t7 to t9, in which a voltage of the third scan line 23 is held to a low logic voltage, and supplies the reference voltage Vref from the regulator 11 to the first node N1. The reference voltage Vref is supplied to a drain electrode of the second TFT T2, a source electrode of the second TFT T2 is connected to the first node N1, and a gate electrode of the second TFT T2 is connected to the third scan line 23.

The third TFT T3 supplies a voltage of a second node N2 to a source electrode of the fourth TFT T4 in response to the second scan pulse SRO during the third to sixth periods t3 to t6. A source electrode of the third TFT T3 is connected to the second node N2, a drain electrode of the third TFT T3 is connected to the source electrode of the fourth TFT T4 and a drain electrode of the driving TFT DTFT, and a gate electrode of the third TFT T3 is connected to the second scan line 22.

The fourth TFT T4 blocks a current path between the driving TFT DTFT and the third TFT T3 and the OLED element OLED in response to the light emitting control pulse EM during the fourth and fifth periods t4 and t5. The fourth TFT T4 is turned on during the first to fourth periods t1 to t4 and the seventh to ninth periods t7 to t9, in which the voltage of the third scan line 23 is held to the low logic voltage, and forms a current path between the driving TFT DTFT and the third TFT T3 and the OLED element OLED. A drain electrode of the fourth TFT T4 is connected to an anode electrode of the OLED element OLED, a source electrode of the fourth TFT T4 is connected to the drain electrode of the driving TFT DTFT and the drain electrode of the third TFT T3, and a gate electrode of the fourth TFT T4 is connected to the third scan line 23.

The fifth TFT T5 is turned on in response to the first scan pulse SCAN during the first to eighth periods t1 to t8 and forms a current path between a third node N3 and the regulator 11. A pulse width of the first scan pulse SCAN is greater than a pulse width of the second scan pulse SRO. A rising time of the first scan pulse SCAN is earlier than a rising time of the second scan pulse SRO. A falling time of the first scan pulse SCAN is later than a falling time of the second scan pulse SRO. A drain electrode of the fifth TFT T5 is connected to the third node N3, a source electrode of the fifth TFT T5 is connected to the regulator 11, and a gate electrode of the fifth TFT T5 is connected to the first scan line 21.

The driving TFT DTFT supplies a current from a high potential power voltage source VDD to the OLED element OLED and controls the current from the high potential power voltage source VDD using a gate-source voltage of the driving TFT DTFT. A drain electrode of the driving TFT DTFT is connected to the drain electrode of the third TFT T3 and the source electrode of the fourth TFT T4, a source electrode of the driving TFT DTFT is connected to the high potential power voltage source VDD, and a gate electrode of the driving TFT DTFT is connected to the second node N2.

The storage capacitor Cstg is connected between the first node N1 and the second node N2 and is held to a gate voltage of the driving TFT DTFT.

A multi-layered organic compound layer is formed between the anode electrode and a cathode electrode of the OLED element OLED. The multi-layered organic compound layer includes a hole injection layer, a hole transport layer, a light emitting layer, an electron transport layer, and an electron injection layer. The OLED element OLED emits light based on a current supplied under the control of the driving TFT DTFT during the ninth period t9. The anode electrode of the OLED element OLED is connected to the third node N3, and the cathode electrode of the OLED element OLED is connected to the low potential power voltage source or the ground level voltage source GND.

An operation of the light emitting cell is described below in stages with reference to FIGS. 2 to 8.

During the first period t1, the first and third TFTs T1 and T3 are held in an off-state because a voltage of the second scan lines 22 is held to a high logic voltage. The second and fourth TFTs T2 and T4 are held in an on-state because a voltage of the third scan lines 23 is held to a low logic voltage. The fifth TFT T5 is turned on in response to the first scan pulse SCAN supplied to the first scan lines 21 and thus changes from an off-state to an on-state. The first node N1 is charged to the reference voltage Vref supplied through the second TFT T2, the second node N2 is charged to a voltage of VDD-Vth-(Vdata-Vref), and the third node N3 is charged to a voltage of VDD-Vth-Vth (of T4), where 'Vth' is a threshold voltage of the driving TFT DTFT, and 'Vth (of T4)' is a threshold voltage of the fourth TFT T4. When the fifth TFT T5 is an off-state, a source-drain current Isd of the driving TFT DTFT flows in the OLED element OLED through the fourth TFT T4 and thus turns on the OLED element OLED.

During the second period t2, the first and third TFTs T1 and T3 are held in the off-state because the voltage of the second scan lines 22 is held to the high logic voltage. The second and fourth TFTs T2 and T4 are held in the on-state because the voltage of the third scan lines 23 is held to the low logic voltage. The fifth TFT T5 is held in the on-state because of the first scan pulse SCAN of the low logic voltage. The voltage of the first node N1 is held to the reference voltage Vref, the voltage of the second node N2 is held to the voltage of VDD-Vth-(Vdata-Vref), and the third node N3 is charged to a voltage Voled of the OLED element OLED. When the fifth TFT T5 is in the on-state, the source-drain current Isd of the driving TFT DTFT flows in the first node N1 via the fourth TFT T4, the fifth TFT T5, and the second TFT T2, and the OLED element OLED is turned off.

During the third period t3, the second scan pulse SRO of the low logic voltage is supplied to the second scan lines 22. The first and third TFTs T1 and T3 are turned on and thus changes from the off-state to the on-state because the voltage of the second scan lines 22 changes from the high logic voltage to the low logic voltage. The second and fourth TFTs T2 and T4 are held in the on-state because the voltage of the third scan lines 23 is held to the low logic voltage. The fifth TFT T5 is held in the on-state because the voltage of the first scan lines 21 is held to the low logic voltage. The voltage of the first node N1 is held to the reference voltage Vref, the voltage of the second node N2 is held to the voltage of VDD-Vth-(Vdata-Vref), and the voltage of the third node N3 is held to the voltage Voled of the OLED element OLED. When the fifth TFT T5 is in the on-state, the source-drain current Isd of the driving TFT DTFT flows in the first node N1 via the fourth TFT T4, the fifth TFT T5, and the second TFT T2, and the OLED element OLED is turned off.

During the fourth period t4, the light emitting control pulse EM of the high logic voltage is supplied to the third scan lines 23. The first and third TFTs T1 and T3 are held in the on-state because the voltage of the second scan lines 22 is held to the low logic voltage. The second and fourth TFTs T2 and T4 are turned off and thus changes from the on-state to the off-state because the voltage of the third scan lines 23 changes from the low logic voltage to the high logic voltage. The fifth TFT T5 is held in the on-state because the voltage of the first scan lines 21 is held to the low logic voltage. The voltage of the first node N1 is held to the reference voltage Vref, the voltage of the second node N2 changes to a voltage of VDD-Vth, and the voltage of the third node N3 is held to the voltage Voled of the OLED element OLED. When the third TFT T3 is turned on, the gate electrode and the drain electrode of the driving TFT DTFT are short-circuited, and thus the driving TFT DTFT operates as a diode. When the fifth TFT T5 is in the on-state, the source-drain current Isd of the driving TFT DTFT flows in the regulator 11 via the fourth TFT T4 and the fifth TFT T5, and the OLED element OLED is turned off. When the data voltage is Data=Vref (black gray level), the sink current reversely flowing in the regulator 11 has a maximum value.

During the fifth period t5, the first, third, and fifth TFTs T1, T3, and T5 are held in the on-state, and the second and fourth TFTs T2 and T4 are held in the off-state. The first node N1 is charged to the data voltage Vdata, the voltage of the second node N2 changes to a voltage of VDD-Vth-(Vdata-Vref), and the voltage of the third node N3 is held to the voltage Voled of the OLED element OLED. In this case, the voltage of the storage capacitor Cstg has a constant charge amount based on Conversation Law of Electrical Charge. When the fifth TFT T5 is in the on-state, the source-drain current Isd of the driving TFT DTFT flows in the second node N2 via the third TFT T3, and the OLED element OLED is turned off.

During the sixth period t6, the first, third, and fifth TFTs T1, T3, and T5 are held in the on-state. The second and fourth TFTs T2 and T4 are turned on and thus change from the off-state to the on-state because the voltage of the third scan lines 23 changes from the high logic voltage to the low logic voltage. The voltage of the first node N1 is held to the data voltage Vdata, the voltage of the second node N2 is held to the voltage of VDD-Vth-(Vdata-Vref), and the voltage of the third node N3 is held to the voltage Voled of the OLED element OLED. When the fifth TFT T5 is in the on-state, the source-drain current Isd of the driving TFT DTFT flows in the second node N2 via the third TFT T3, and the OLED element OLED is turned off.

During the seventh period t7, the first and third TFTs T1 and T3 are turned off and thus changes from the on-state to the off-state because the voltage of the second scan lines 22 changes from the low logic voltage to the high logic voltage. The second, fourth, and fifth TFTs T2, T4, and T5 are held in the on-state. The first and third TFTs T1 and T3 are turned off at a time when the second and fourth TFTs T2 and T4 are turned on. The voltage of the first node N1 changes from the data voltage Vdata to the reference voltage Vref, the voltage of the second node N2 is held to the voltage of VDD-Vth-(Vdata-Vref), and the voltage of the third node N3 is held to the voltage Voled of the OLED element OLED. When the fifth TFT T5 is in the on-state, the source-drain current Isd of the driving TFT DTFT flows in the first node N1 via the fourth TFT T4, the fifth TFT T5, and the second TFT T2, and the OLED element OLED is turned off.

During the eighth period t8, the first and third TFTs T1 and T3 are held in the off-state, and the second and fourth TFTs T2 and T4 are held in the on-state. The fifth TFT T5 is turned off and thus changes from the on-state to the off-state because the voltage of the first scan lines 21 changes from the low logic voltage to the high logic voltage. The voltage of the first node N1 is held to the reference voltage Vref, the voltage of the second node N2 is held to the voltage of VDD-Vth-(Vdata-Vref), and the voltage of the third node N3 is held to the voltage Voled of the OLED element OLED. When the fifth TFT T5 is in the on-state, the source-drain current Isd of the driving TFT DTFT flows in the first node N1 via the fourth TFT T4, the fifth TFT T5, and the second TFT T2, and the OLED element OLED is turned off.

During the ninth period t9, the first, third, and fifth TFTs T1, T3, and T5 are held in the off-state, and the second and fourth TFTs T2 and T4 are held in the on-state. The voltage of the first node N1 is held to the reference voltage Vref, the voltage of the second node N2 is held to the voltage of VDD-Vth-(Vdata-Vref), and the voltage of the third node N3 is held to the voltage Voled of the OLED element OLED. When the fifth TFT T5 is in the on-state, the source-drain current Isd of the driving TFT DTFT flows in the OLED element OLED via the fourth TFT T4, and the OLED element OLED is turned on. During the ninth period t9, a current $I_{OLED}$, that is not affected by the threshold voltage Vth of the driving TFT DTFT as indicated in the following Equation 1, flows in the OLED element OLED.

$$I_{OLED} = \frac{1}{2}\cdot k\cdot (Vgs-|Vth|)^2 \quad \Leftarrow Vgs = Vdata + Vth = Vref \qquad \text{[Equation 1]}$$
$$= \frac{1}{2}\cdot k\cdot \frac{W}{L}(Vdata - Vref)^2$$

In Equation 1, k is a constant of a function including a mobility μ and a parasitic capacitance Cox of the driving TFT DTFT, L is a channel length of the driving TFT DTFT, and W is a channel width of the driving TFT DTFT.

Figure 9:
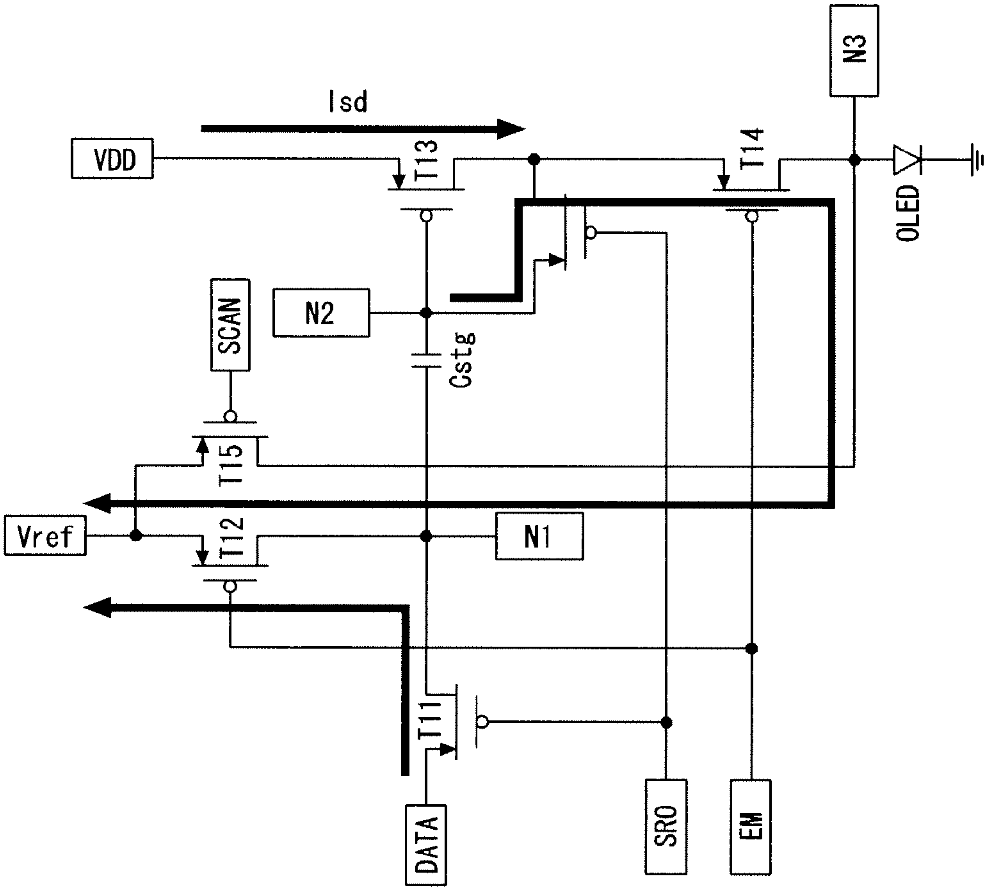
FIG. 9 is a circuit diagram illustrating another configuration of a light emitting cell according to an exemplary embodiment of the invention.

FIG. 9 is a circuit diagram illustrating another configuration of the light emitting cell according to the exemplary embodiment of the invention. FIG. 10 is a waveform diagram illustrating a driving signal waveform of the light emitting cell shown in FIG. 9.

As shown in FIGS. 9 and 10, the light emitting cell includes first to fifth TFTs T11 to T15, a driving TFT DTFT, a storage capacitor Cstg, and an OLED element OLED. The first to fifth TFTs T11 to T15 and the driving TFT DTFT are implemented as a p-type MOSFET.

The first TFT T11 is a switch TFT for supplying the data voltage DATA to the first node N1 in response to the second scan pulse SRO. The first TFT T11 is turned on during third and fourth periods t13 and 14, in which the second scan pulse SRO is supplied, and forms a current path between the data line 20 and the first node N1. A drain electrode of the first TFT T11 is connected to the first node N1, a source electrode of the first TFT T11 is connected to the data line 20, and a gate electrode of the first TFT T11 is connected to the second scan line 22.

The second TFT T12 blocks a current path between the first node N1 and the regulator 11 in response to the light emitting control pulse EM during the fourth period t14. The second TFT T12 is turned on during first to third periods t11 to t13 and a fifth period t15, in which the voltage of the third scan line 23 is held to the low logic voltage, and supplies the reference voltage Vref from the regulator 11 to the first node N1. The reference voltage Vref is supplied to a source electrode of the second TFT T12, a drain electrode of the second TFT T12 is connected to the first node N1, and a gate electrode of the second TFT T12 is connected to the third scan line 23.

The third TFT T13 supplies the voltage of the second node N2 to a source electrode of the fourth TFT T14 in response to the second scan pulse SRO during the third and fourth periods t13 and t14. A source electrode of the third TFT T13 is connected to the second node N2, a drain electrode of the third TFT T13 is connected to the source electrode of the fourth TFT T14 and a drain electrode of the driving TFT DTFT, and a gate electrode of the third TFT T13 is connected to the second scan line 22.

The fourth TFT T14 blocks a current path between the driving TFT DTFT and the third TFT T13 and the OLED element OLED in response to the light emitting control pulse EM during the fourth period t14. The fourth TFT T14 is turned on during the first to third periods t1 to t13 and the fifth period t15, in which the voltage of the third scan line 23 is held to the low logic voltage, and forms a current path between the driving TFT DTFT and the third TFT T13 and the OLED element OLED. A drain electrode of the fourth TFT T14 is connected to an anode electrode of the OLED element OLED, a source electrode of the fourth TFT T14 is connected to the drain electrode of the driving TFT DTFT and the drain electrode of the third TFT T13, and a gate electrode of the fourth TFT T14 is connected to the third scan line 23.

The fifth TFT T15 is turned on in response to the first scan pulse SCAN during the second to fourth periods t12 to t14 and forms a current path between a third node N3 and the regulator 11. A pulse width of the first scan pulse SCAN is greater than a pulse width of the second scan pulse SRO. A rising time of the first scan pulse SCAN is earlier than a rising time of the second scan pulse SRO, and a falling time of the first scan pulse SCAN is the same as a falling time of the second scan pulse SRO. A drain electrode of the fifth TFT T15 is connected to the third node N3, a source electrode of the fifth TFT T15 is connected to the regulator 11, and a gate electrode of the fifth TFT T15 is connected to the first scan line 21.

The driving TFT DTFT supplies a current from the high potential power voltage source VDD to the OLED element OLED and controls the current from the high potential power voltage source VDD using the gate-source voltage of the driving TFT DTFT. A drain electrode of the driving TFT DTFT is connected to the drain electrode of the third TFT T13 and the source electrode of the fourth TFT T14, a source electrode of the driving TFT DTFT is connected to the high potential power voltage source VDD, and a gate electrode of the driving TFT DTFT is connected to the second node N2.

The storage capacitor Cstg is connected between the first node N1 and the second node N2 and is held to a gate voltage of the driving TFT DTFT.

A multi-layered organic compound layer is formed between the anode electrode and a cathode electrode of the OLED element OLED. The multi-layered organic compound layer includes a hole injection layer, a hole transport layer, a light emitting layer, an electron transport layer, and an electron injection layer. The OLED element OLED emits light based on a current supplied under the control of the driving TFT DTFT during the fifth period t15. The anode electrode of the OLED element OLED is connected to the third node N3, and the cathode electrode of the OLED element OLED is connected to the low potential power voltage source or the ground level voltage source GND.

In the light emitting cell shown in FIG. 9, a sink current may flow in the regulator 11 as indicated by an arrow of FIG. 9 during the third period t13 in which the voltages of the first to third scan lines 21 to 23 are held to the low logic voltage.

Figure 11:
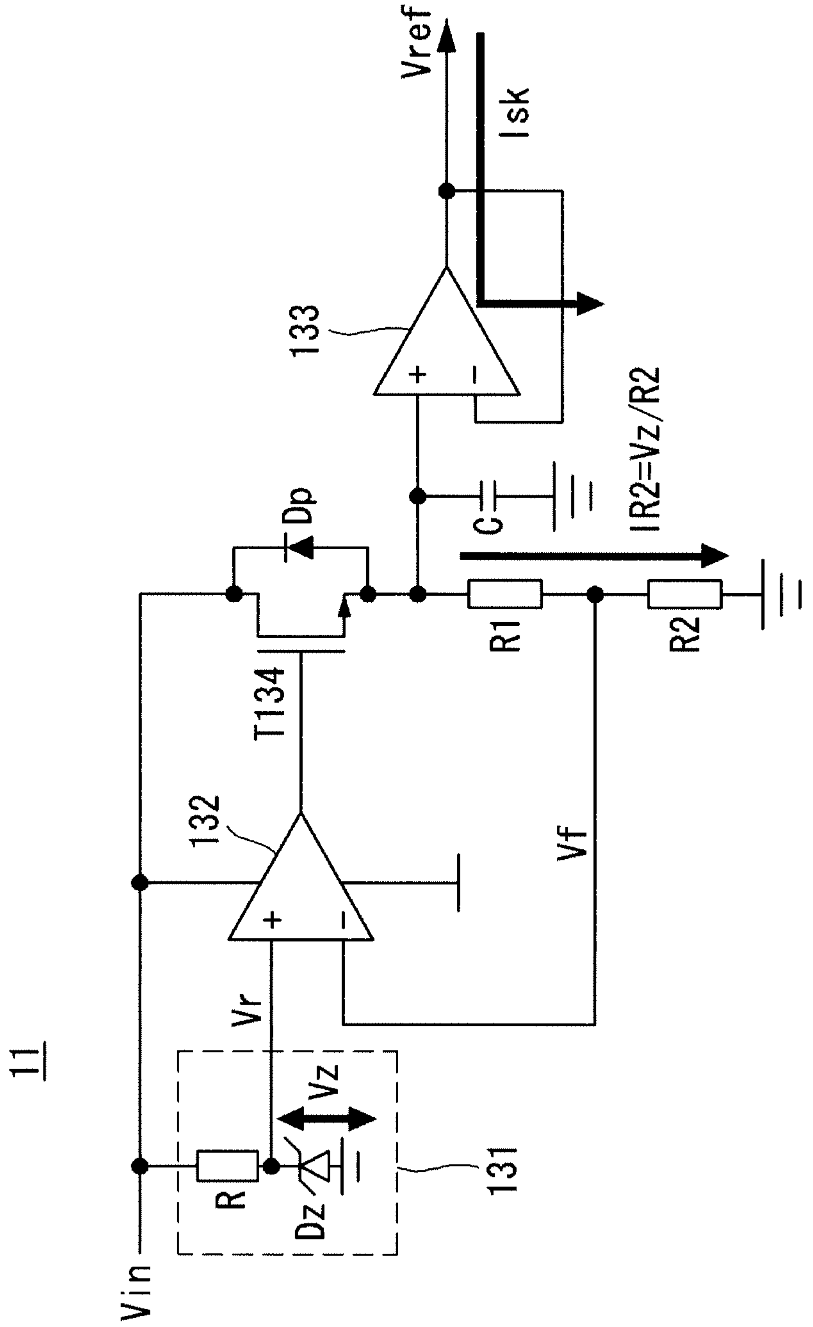
FIG. 11 is a circuit diagram illustrating a configuration of a regulator according to an exemplary embodiment of the invention.
Figure 12:
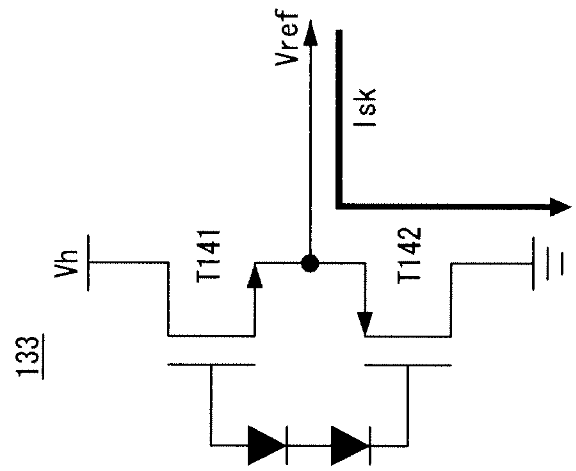
FIG. 12 is a circuit diagram illustrating an output terminal of the regulator shown in FIG. 11.

FIG. 11 is a circuit diagram illustrating a configuration of the regulator according to the exemplary embodiment of the invention. FIG. 12 is a circuit diagram illustrating an output terminal of the regulator shown in FIG. 11.

As shown in FIG. 14, the regulator 11 according to the exemplary embodiment of the invention includes a reference voltage generating unit 131, a comparator 132, a TFT T134, a voltage division resistor circuit R1R2, and a buffer 133.

The reference voltage generating unit 131 includes a resistor R and a zener diode Dz and outputs a reference voltage Vr. The comparator 132 compares the reference voltage Vr with a feedback voltage Vf of a voltage of an output terminal of the comparator 132. When The comparator 132 turns on the TFT T134 when the feedback voltage Vf is less than the reference voltage Vr, to uniformly hold the reference voltage Vref output through the output terminal of the regulator 11. The TFT T134 is turned on or off under the control of the comparator 132 and switches on or off a current path between an input voltage Vin and the voltage division resistor circuit R1 and R2. The input voltage Vin is supplied to a drain electrode of the TFT T134, a source electrode of the TFT T134 is connected to a first resistor R1 of the voltage division resistor circuit R1R2, and a gate electrode of the TFT T134 is connected to the output terminal of the comparator 132. In FIG. 11, Dp denotes a parasitic diode of the TFT T134. The voltage division resistor circuit R1R2 includes first and second resistors R1 and R2 connected in series to each other. The voltage division resistor circuit R1R2 divides a voltage of a voltage of an output terminal of the regulator so as to generate a feedback voltage Vf, and inputs the feedback voltage Vf to an inverting terminal of the comparator 132 through a node between the first and second resistors R1 and R2.

The reference voltage Vref output from the regulator 11 depends on a voltage Vz of the zener diode Dz. Because a voltage of the voltage division resistor circuit R1R2 is always constant, the voltage division resistor circuit R1R2 outputs the constant feedback voltage Vf if the voltage Vz of the zener diode Dz does not change.

The buffer 133 transmits the reference voltage Vref input through the TFT T134 to the output terminal of the regulator 11 using an operational amplifier (OP AMP) without a loss of the reference voltage Vref. The buffer 133 discharges a sink current Isk coming from the discharge cells to the ground level voltage source GND, thereby preventing changes of the reference voltage Vref generated because of a swing of the input voltage Vin resulting from the sink current Isk. As shown in FIG. 12, an output terminal of the buffer 133 has a structure in which an n-type TFT T141 and a p-type TFT T142 are connected in an inverter push-pull form. The sink current Isk reversely flowing from the light emitting cells in the regulator 11 is discharged to the ground level voltage source GND through a source-drain of the p-type TFT T142.

Figure 13:
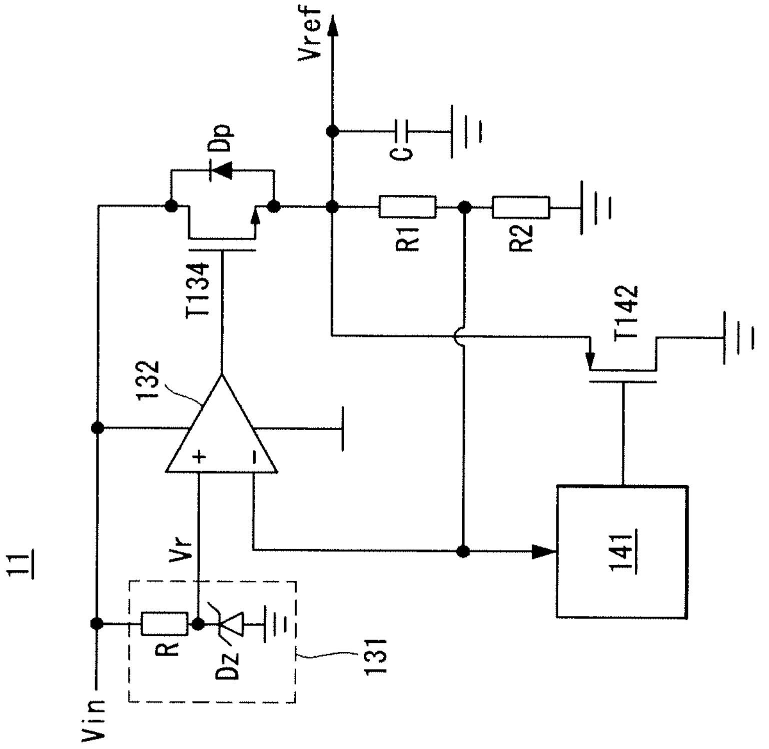
FIG. 13 is a circuit diagram illustrating another configuration of a regulator according to an exemplary embodiment of the invention.

FIG. 13 is a circuit diagram illustrating another configuration of the regulator according to the exemplary embodiment of the invention.

As shown in FIG. 13, the regulator 11 according to the exemplary embodiment of the invention includes a reference voltage generating unit 131, a comparator 132, a TFT T134, a voltage division resistor circuit R1R2, a sink controller 141, and a TFT T142. Since configurations of the reference voltage generating unit 131, the comparator 132, the TFT T134, and the voltage division resistor circuit R1R2 in FIG. 13 are substantially the same as those shown in FIG. 11, a further description may be briefly made or may be entirely omitted.

The sink controller 141 and the TFT T142 discharge the sink current Isk to the ground level voltage source GND, so that the sink current Isk reversely flowing from the discharge cells does not affect the input voltage Vin. When the sink current Isk flows in the regulator 11, a feedback voltage Vf sensed by a second resistor R2 of the voltage division resistor circuit R1R2 rises. When the feedback voltage Vf sensed by the second resistor R2 is equal to or greater than the reference voltage Vr, the sink controller 141 turns on the TFT T142 and discharges the sink current Isk to the ground level voltage source GND. When the feedback voltage Vf does not rise and is held to a constant voltage, the sink controller 141 turns off the TFT T142. The TFT T142 may be implemented as a p-type MOSTFT. A source electrode of the TFT T142 is connected to the output terminal of the regulator 11, a drain electrode of the TFT T142 is connected to the ground level voltage source GND, and a gate terminal of the TFT T142 is connected to an output terminal of the sink controller 141.

In the circuits shown in FIGS. 11 and 12, the circuits capable of rapidly discharging the sink current may be together applied to one regulator 11.

As described above, the exemplary embodiment of the invention adds a circuit capable of breaking the sink current to the regulator, thereby holding the reference voltage constant even if the sink current reversely flows in the regulator. Furthermore, the exemplary embodiment of the invention holds the reference voltage, that is supplied to a pixel circuit compensating for the threshold voltage of the driving TFT of the light emitting cell, constant using the regulator, thereby increasing the display quality of the OLED display.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A regulator comprising:

a reference voltage generating unit configured to generate a reference voltage from an input voltage;

a voltage division resistor circuit configured to divide a voltage of an output terminal of the regulator to generate a feedback voltage;

a comparator configured to compare the reference voltage with the feedback voltage;

a transistor configured to be turned on or off based on an output of the comparator and switch on or off the input voltage supplied to the output terminal; and a sink current breaking circuit configured to discharge a sink current flowing in the output terminal to a ground level voltage source, wherein the sink current breaking circuit includes a buffer connected between the voltage division resistor circuit and the output terminal, the buffer includes a n-type TFT and a p-type TFT which are connected in an inverter push-pull form, and the p-type TFT is connected between the output terminal and the ground level voltage source and discharges the sink current to the ground level voltage source.

2. An organic light emitting diode display comprising:

a display panel on which data lines and scan lines are positioned to cross one another and light emitting cells each including an organic light emitting diode and a driving thin film transistor are arranged in a matrix form;

a data driver configured to supply a data voltage to the data lines;

a scan driver configured to supply a scan pulse to the scan lines; and a regulator including:

a reference voltage generating unit configured to generate a reference voltage from an input voltage;

a voltage division resistor circuit configured to divide a voltage of an output terminal of the regulator to generate a feedback voltage;

a comparator configured to compare the reference voltage with the feedback voltage;

a transistor configured to be turned on or off based on an output of the comparator and switch on or off the input voltage supplied to the output terminal; and a sink current breaking circuit configured to discharge a sink current flowing in the output terminal to a ground level voltage source, wherein the regulator supplies a reference voltage for compensating for a threshold voltage of the driving thin film transistor to the display panel, and wherein the sink current breaking circuit includes a buffer connected between the voltage division resistor circuit and the output terminal, the buffer includes a n-type TFT and a p-type TFT which are connected in an inverter push-pull form, and the p-type TFT is connected between the output terminal and the ground level voltage source and discharges the sink current to the ground level voltage source.

* * * * *